(12) United States Patent
Beijer et al.

(10) Patent No.: US 9,560,710 B2
(45) Date of Patent: Jan. 31, 2017

(54) LIGHT UNIT FOR EMITTING LIGHT AND METHOD FOR DRIVING A LIGHT UNIT

(71) Applicant: PHILIPS LIGHTING HOLDING B.V., Eindhoven (NL)

(72) Inventors: Johannes Gerrit Jan Beijer, Bavel (NL); Bertrand Johan Edward Hontele, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/176,124

(22) Filed: Jun. 7, 2016

(65) Prior Publication Data

US 2017/0006680 A1    Jan. 5, 2017

Related U.S. Application Data

(63) Continuation-in-part of application No. 15/032,385, filed as application No. PCT/EP2014/072660 on Oct. 22, 2014.

(51) Int. Cl.
*H05B 37/02*    (2006.01)
*H05B 33/08*    (2006.01)

(52) U.S. Cl.
CPC ...... *H05B 33/0845* (2013.01); *H05B 33/0812* (2013.01); *H05B 33/0827* (2013.01); *H05B 33/0857* (2013.01)

(58) Field of Classification Search
CPC ............ H05B 33/0815; H05B 33/0827; H05B 33/0845
USPC ..................................... 315/185 R, 186, 192
See application file for complete search history.

(56) References Cited

U.S. PATENT DOCUMENTS

| | | | |
|---|---|---|---|
| 8,456,109 B1 | 6/2013 | Wray | |
| 8,710,754 B2* | 4/2014 | Baddela | H05B 33/086 315/192 |
| 2006/0033456 A1* | 2/2006 | Tsai | H05B 33/0803 315/312 |
| 2007/0171159 A1* | 7/2007 | Lee | H05B 33/0857 345/83 |
| 2008/0012502 A1 | 1/2008 | Lys | |
| 2011/0031890 A1 | 2/2011 | Stack | |
| 2012/0242230 A1* | 9/2012 | Jin | H05B 33/0815 315/121 |

(Continued)

FOREIGN PATENT DOCUMENTS

| | | |
|---|---|---|
| DE | 102012205349 A1 | 10/2013 |
| WO | WO2010103480 A2 | 9/2010 |

*Primary Examiner* — Tung X Le

(57) ABSTRACT

Lighting unit including a plurality of lighting devices, comprising: a first and a second current path each comprising at least one lighting device, the second current path is adapted to conduct while the first current path is adapted to not conduct when the total current is below a first threshold current, a current limiter for limiting the current in the second current path to shape a plateau in the current in the second current path when the total current is above the first threshold current; and a third current path comprising at least one lighting device, connected in parallel to the first and second current path, and comprises a third current regulator for controlling a current in the third current path; and a third control unit adapted to control the third current regulator based on a weighted sum of the current in the second and the first current path.

15 Claims, 19 Drawing Sheets

(56) References Cited

U.S. PATENT DOCUMENTS

2013/0057163 A1 3/2013 Sutardja et al.
2013/0063035 A1 3/2013 Baddela et al.

* cited by examiner

LIGHT UNIT FOR EMITTING LIGHT AND METHOD FOR DRIVING A LIGHT UNIT

FIELD OF THE INVENTION

The present invention relates to a light unit including a plurality of lighting devices, in particular a plurality of LEDs for emitting light. Further, the present invention relates to a method for driving a light unit including a plurality of lighting devices, in particular a plurality of LEDs.

BACKGROUND OF THE INVENTION

In the field of retrofit lamps for replacing incandescent lamps by light units having a lower power consumption and a longer lifetime, solutions are demanded to provide a pleasant atmosphere and a behavior comparable to the incandescent lamps to be replaced.

The color of the light emitted by incandescent lamps is dependent on the electrical power provided to the lamp so that the color of the emitted light becomes warmer when the incandescent lamps are dimmed. This color shift during dimming is appreciated by the user of incandescent lamps since the warmer white provides a more pleasant atmosphere.

Since retrofit lamps which are based on LEDs do not have a color shift of the emitted light during dimming, additional effort is necessary to emulate the dimming behavior of incandescent lamps.

A simple and commonly known solution is to add amber-colored LEDs to the white LEDs which are activated when the retrofit lamp is dimmed to a predefined dimming level. By means of the amber LEDs, the emitted light is shifted to a warmer white color. However, in addition to the additional amber LEDs, a circuitry is necessary to balance the current between the white and the amber LEDs to obtain a proper color point, so that the overall technical effort of these retrofit lamps is increased.

A possibility to distribute the current between the white LEDs and the amber LEDs is to provide a string of white LEDs and a parallel string of amber LEDs and to control the current of the amber LEDs by means of a transistor as disclosed in WO 2010/103480 A2. The disadvantage of the solution is that the control of the current ratio is difficult and expensive since very low voltages need to be measured and amplified with low offset voltage operational amplifiers so that the overall technical effort is large.

US2013/0063035 also discloses a light unit provided with in parallel a string of white LEDs and a string of amber LEDs. The current in the string with amber LEDs is controlled by a current regulator. In a simple configuration, the current regulator may keep the current in the string with amber LEDs constant. However this does not provide a dimming behavior comparable to an incandescent lamp. Alternatively the current regulator may be controlled by a microprocessor in order to simulate the dimming curve of an incandescent lamp during dimming. The use of a microprocessor is complicated and expensive.

SUMMARY OF THE INVENTION

It is therefore an object of the present invention to provide a light unit having a low power consumption and a dimming behavior comparable to an incandescent lamp with low technical effort and at low cost. It is further an object of the present invention provide a corresponding method for driving a light unit.

The inventor finds that adding a greenish color such as green/lime/mint color, or a yellowish color that above the BBL with x in between the x of the cool white (x>0.35) and smaller than the x of the flame white (x<0.5), at proper dimming level, can even improve the dimming behavior.

A basic idea of the invention is providing the greenish/yellowish color depending on a weighted sum of the current in the warm light and the current in the cool light. This provides a simple way of controlling the greenish/yellowish color.

More preferably, the weight on the warm light is larger. Thus the greenish/yellowish current will increase as the cool light increases while the warm light is flat during a medium brightness; and the greenish/yellowish current will decrease as the warm light decreases in the high brightness.

According to the basic aspect of the invention, it provides a lighting unit including a plurality of lighting devices, in particular a plurality of LEDs, for emitting light, comprising: connection terminals for connecting the light unit to an external power supply and for receiving a total current from the external power supply, a first current path and a second current path each comprising at least one lighting device, wherein the first current path and the second current path are connected in parallel to each other and the second current path is adapted to conduct while the first current path is adapted to not conduct when the total current is below a first threshold current, wherein the second current path has a current regulator for controlling an electrical current in the second current path, a control unit adapted to control the current regulator on the basis of the electrical current in the second current path and on the basis of the total current, and a current limiter for limiting the current in the second current path so as to shape a plateau in the current in the second current path when the total current is above the first threshold current; wherein the lighting unit further comprises: a third current path comprising at least one lighting device, wherein the third current path is connected in parallel to the first and second current path, and comprises a third current regulator for controlling a third electrical current in the third current path; and a third control unit adapted to control the third current regulator based on a weighted sum of the electrical current in the second current path and the electrical current in the first current path.

Preferably, a second weight on the current in the second current path is higher than a first weight on the current in the first current path.

Preferably, the third control unit is adapted to control the current in the third current path to increase gradually from zero when the total current is above the first threshold current. This provides a better dimming behavior.

Preferably the control unit is adapted to control the current in the second current path decrease to substantial zero gradually when the total current is above a second threshold current; and said third control unit adapted to control the current in the third current path decrease to substantial zero gradually when the total current is above the second threshold current. This provides a better dimming behavior.

Preferably said third control unit adapted to control the current in the third current path reach zero before the current in the second current path reaches zero. This keeps the current in the third current path zero when the brightness reaches the maximum.

Preferably the lighting device in the first current path, the lighting device in the second current path and the lighting device in the third current path have different color or color temperature. This provides an innovation for tuning the color or color temperature according to the brightness. Specifically the lighting device in the first current path is cool white, the lighting device in the second current path is warm white, and the lighting device in the third current path is greenish color such green color or lime color or mint color, or yellowish color. This can provide the similar dimming behavior as the incandescent lamp.

Preferably the current limiter is an electrical resistor for limiting the current in the second current path and the resistance of the controllable resistor is set to zero when the total current is between the first threshold current and the second threshold current, and the controllable resistor comprises a transistor in series with the electrical resistor. This provides a simple solution for providing the plateau current in the second current path.

Preferably the second current path comprises a second sense resistor, the first current path comprises a first sense resistor, and the third control unit comprises a second operational amplifier connected to an interconnection of the first sense resistors and the second sense resistor, wherein the second sense resistor is higher than the first sense resistor such that said second weight is higher than the first weight. This provides an implementation that gives the different weighting on the second current path and the first current path. Preferably high value resistors are between the intersection and the first sense resistors and between the intersection and the second sense resistors. These high value resistors are for limiting current in the control loop.

Preferably the third control unit comprises a third internal voltage supply for providing a third reference voltage that is relevant with the first threshold current and the total current at which the current in the third current path reaches zero, and said third internal voltage supply is in series with a third sense resistor in the third current path and the third control unit comprises a third current regulator in series with the lighting device in the third current path and a comparator, the series connection of the internal voltage supply and the third sense resistor is connected to a negative feed in terminal of the comparator, and the interconnection is connected to a positive feed in terminal of the comparator, and an output of the comparator is connected to the third current regulator. This embodiment gives the detailed implementation of the third current path.

Preferably the third current path further comprises a third current limiter for limiting the current in the third current path so as to shape: a plateau in the current in the third current path. The plateau in the third current path can further improve the dimming behavior.

More specifically, the third current limiter comprises an electrical resistor has a resistance so that the plateau current in the third current path is set corresponding to a voltage drop difference from the at least one lighting device of the first current path to the at least one lighting device of the third current path. Even more specifically, the electrical resistor equals to the quotient resulted from the voltage drop divided by the plateau current in the third current path. This provides a low cost solution for providing the plateau current in the third current path.

These and other aspects of the invention will be apparent from and elucidated with reference to the embodiment(s) described hereinafter.

BRIEF DESCRIPTION OF THE DRAWINGS

These and other aspects of the invention will be apparent from and elucidated with reference to the embodiment(s) described hereinafter. In the following drawings

FIG. 5 shows a further embodiment of the light unit of FIG. 1a;

DETAILED DESCRIPTION OF THE INVENTION

Figure 1A:
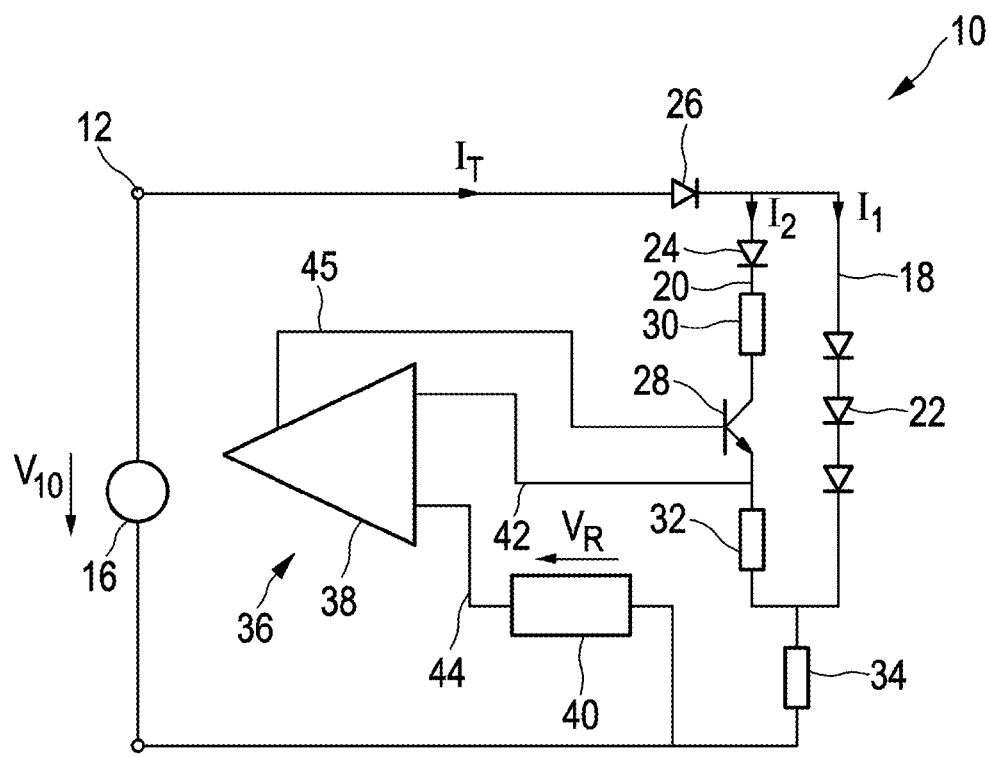
FIG. 1a shows a schematic block diagram of a lighting device having different current paths and FIG. 1b a diagram showing the current in the different current paths.

FIG. 1a shows a lighting device generally denoted by 10. The lighting device 10 comprises two input terminals 12, 14 for connecting the lighting device 10 to a power supply 16 and for receiving a drive voltage V10 and/or a drive current $I_T$ from the power supply 16. The power supply 16 may be a voltage supply or a current supply. The lighting device 10 comprises a first current path 18 and a second current path 20 connected in parallel to each other and connected to the input terminals 12, 14 for receiving the input voltage V10. The first current path 18 comprises a plurality of LEDs 22, preferably emitting white light and wherein the second current path 20 comprises at least one LED 24 which preferably emits amber light (phosphor coated LEDs). In series to the first and the second current path 18, 20 one or more white LEDs 26 can be connected.

The drive current $I_T$ as a total current $I_T$ is provided to the light unit for driving the LEDs 22, 24, 26 as a drive current, wherein the total current $I_T$ is split in two currents $I_1$, $I_2$ in the two parallel current paths 18, 20, respectively. The light emission of the light unit 10 is controlled and determined by the total current $I_T$ provided to the light unit 10.

The second current path 20 further comprises a controllable resistor 28, which is preferably formed as a bipolar transistor 28, and a current limiter 30, which is formed as an electrical resistor 30 in order to control the current $I_2$ in the second current path 20 as described in the following.

The controllable resistor 28 controls the current $I_2$ in the second current path 20 in order to increase an amount of amber light emitted from the light unit 10 when the total current $I_T$ is decreased and the light unit 10 is dimmed as described in the following.

The second current path 20 further comprises a sense resistor 32 for measuring the current $I_2$ in the second current path 20. The first current path 18 and the second current path 20 are connected via a sense resistor 34 to one of the input terminal 14 for measuring the total current $I_T$.

The light unit 10 further comprises a control unit 36 for controlling the controllable resistor 28 on the basis of the current $I_2$ in the second current path 20 and the total current $I_T$. The control unit 36 comprises an operational amplifier 38 and a reference voltage supply 40. Input terminals 42, 44 of the operational amplifier 38 are connected to the sense resistors 32, 34 and to the reference voltage supply 40. The output terminal 45 of the operational amplifier 38 is connected to the controllable resistor 28 for controlling the controllable resistor 28. Since the input terminals 42, 44 are connected to the sense resistors 32, 34 and to the reference voltage supply 40, the controllable resistor 28 can be controlled on the basis of a voltage drop corresponding to the current $I_2$ in the second current path 20 and the total current $I_T$ and on the basis of a threshold level $V_R$ provided by the reference voltage supply 40. If the voltage drop across the sense resistors 32, 34 is larger than the reference voltage $V_R$ provided by the reference voltage supply 40, the resistance of the controllable resistor 28 is set to a large value or to an infinite value. If the voltage drop across the sense resistors 32, 34 is lower than the reference voltage $V_R$, the resistance of the controllable resistor 28 is set to 0 and in other cases, i.e. for values between, the resistance of the controllable resistor 28 is set to a value so that the voltage drop across the sense resistors 32, 34 is equal to the reference voltage $V_R$. For the case that the resistance of the controllable resistor 28 is set to 0, the current limiter 30, which is formed as electrical resistor 30 limits the current $I_2$ to a predefined level so that the technical effort for controlling the current $I_2$ for low total current values is reduced. Consequently, the ratio of the currents $I_1$ and $I_2$ of the first and the second current path 18, 20 can be set depending on the total current $I_T$ so that amber light can be added to the light emitted by the light unit 10 when the light unit 10 is dimmed. Hence, the dimming behavior of an incandescent lamp can be emulated.

Figure 1B:
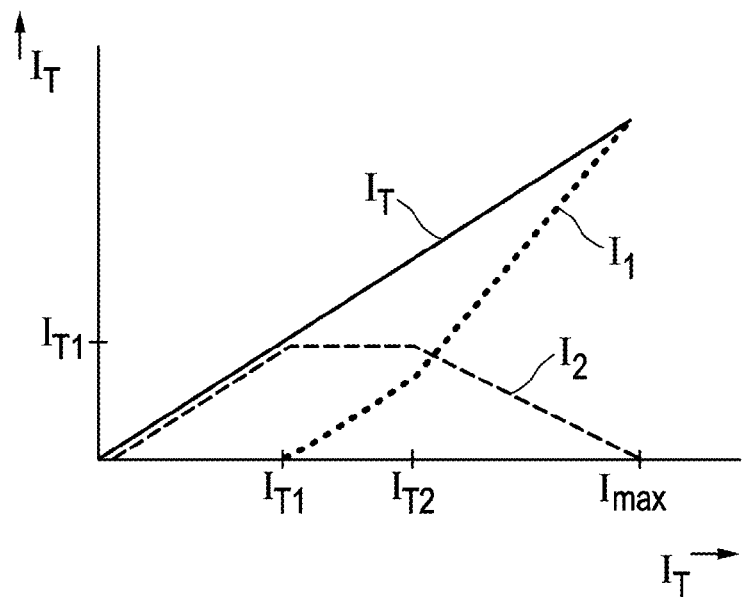

In FIG. 1b the total current $I_T$, the current $I_1$ in the first current path 18 and the current $I_2$ in the second current path 20 are shown dependent on the total current $I_T$. At $I_{max}$ as a maximum value of the total current $I_T$, the resistance of the controllable resistor 28 is large or infinite so that the current $I_1$ is identical with the total current $I_T$ and only the white LEDs 22 are powered to emit light. When the total current $I_T$ is reduced in a range between a total current $I_{T2}$ and the maximum total $I_{max}$, the resistance of the controllable resistor 28 is set to a value such that $R_A*I_1+R_T*I_T=V_R$, wherein $R_A$ is the resistance of the sense resistor 32 and $R_T$ is the resistance of the sense resistor 34. Hence, the current $I_1$ decreases and the current $I_2$ increases so that the amount of white light emitted by the LEDs 22 is reduced while the amount of amber light provided by the LED 24 is increased. As shown in FIG. 1b, the current $I_1$ decreases faster than the current $I_2$ increases so that the total current $I_T$ decreases and the overall light emission of the light unit 10 decreases. For values of the total current $I_T$ lower than the current $I_{T2}$, the resistance of the controllable resistor 28 is set to 0. Hence, the ratio of the currents $I_1$ and $I_2$ is merely controlled by means of the voltage drop at the LEDs 22, 24 and the current limiter 30. Since the voltage drop at the LEDs 22, 24 is almost constant for a large current range, the voltage drop at the current limiter 30 corresponds to the voltage drop difference between the LEDs 22 of the first current path 18 and the voltage drop of the LED 24 of the second current path 20. Due to the constant voltage drop at the LEDs 22, the current limiter 30 sets the current $I_2$ to a corresponding constant current level. Hence, the current $I_2$ of the second current path 20 is set to a constant level $I_{T1}$ until the total current $I_T$ drops below this constant level $I_{T1}$. For a total current $I_T$ below $I_{T1}$, the current $I_1$ is 0 and the current $I_2$ in the second current path 20 is identical with the total current $I_T$. Hence, the relative amount of amber light can be continuously increased when the light unit 10 is dimmed with low technical effort, since the current limiter 30 controls the current $I_2$ in the second current path 20 for lower current levels. Further, the control of the current $I_2$ in the second current path 20 is only dependent on the total current $I_T$, so that the light unit 10 can be dimmed without additional effort for the user. Below $I_{T1}$, the relative amount of amber light is nearly constant since $I_1=0$ and therefore $I_T=I_2$ without current control by means of the controllable resistor 28.

The size of the current limiter 30, which is formed as an electrical resistor is selected corresponding to the voltage drop difference between the LEDs 22, 24 of the first current path 18 and the second current path 20 and the constant current $I_{T1}$ to which the current $I_2$ should be limited. For example, if the voltage drop of the LEDs 22, 24 is 3 V, the voltage drop difference for the embodiment shown in FIG. 1a is 6 V and for the case that the maximum current $I_{T1}$ in the second current path 20 is 100 mA, the resistance of the current limiter 30 is set to 60Ω.

By means of the current limiter 30, a lower maximum of the current $I_2$ in the second current path 20 can be achieved since the current $I_2$ is limited to the value $I_{T1}$ that forms a plateau in the current diagram as shown in FIG. 1a. Further, by means of the plateau of the current $I_2$, the current $I_1$ in the first current path 18 is reduced with a lower gain so that a more gradual change of the emitted color can be achieved.

Figure 2A:
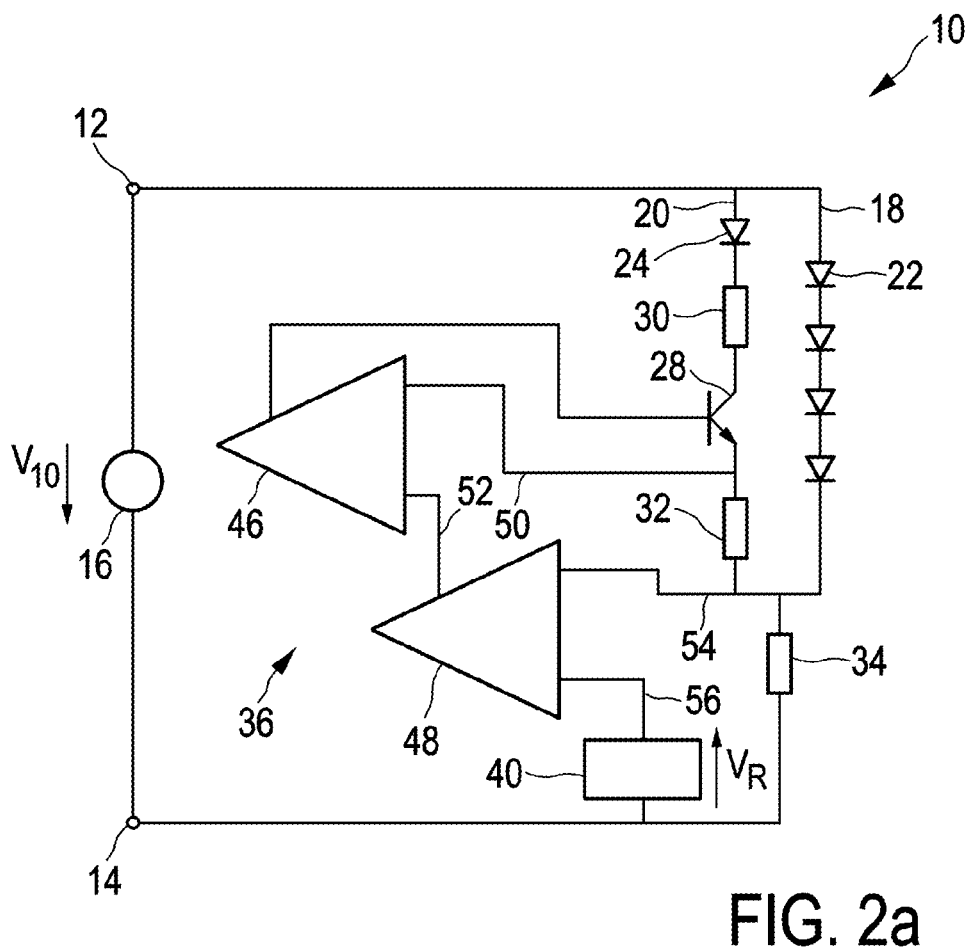
FIG. 2a shows a schematic block diagram of an embodiment of the lighting device of FIG. 1 and FIG. 2b a corresponding current diagram.
Figure 2B:
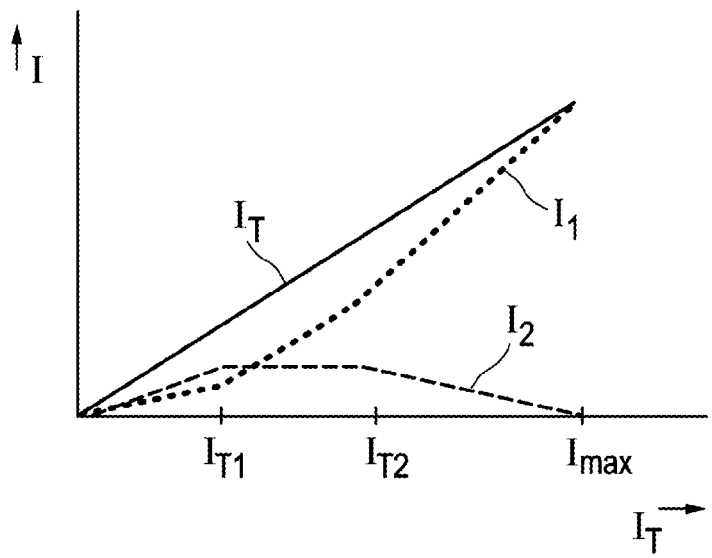

A further embodiment of the light unit 10 is shown in FIG. 2a and the corresponding current diagram is shown in FIG. 2b. Identical elements are denoted by identical reference numerals, wherein here merely the differences are explained in detail.

The control unit 36 comprises in this embodiment two operational amplifiers 46, 48 connected in a cascade to each other, wherein the first operational amplifier 46 is connected to the controllable resistor 28 for driving the controllable resistor 28. The input terminals 50, 52 of the first operational amplifier 46 are connected to the sense resistor 32 and to the output of the second operational amplifier 48. The input terminals 54, 56 of the second operational amplifier 48 are connected to the sense resistor 34 and to the reference voltage supply 40. Hence, the resistance of the controllable resistor 28 can be set more precisely on the basis of independent measurements of the sense resistors 32, 34 and a lower current $I_2$ in the second current path 20 can be set to a lower maximum value so that the amber LED 24 can be relieved electrically and/or thermally.

The respective current diagram is shown in FIG. 2b, wherein it is shown that the current $I_1$ and the current $I_2$ can be controlled more precisely and the current $I_1$ is reduced with a lower gain so that a more continuous change of the emitted light color can be achieved. for total currents below $I_{T1}$, the currents $I_1$ and $I_2$ have a nearly constant ratio, determined by the current control, resulting in a nearly constant relative amount of amber light. Hence, a more pleasure change of the emitted light color can be achieved.

Finally also in this case, if there would be no plateau region, there would exist a transition point at the maximum amber current position, where on the left a first control loop is active and on the right a second control loop, both controlling the transistor. This sudden transition can cause some flickering at and near this point. The presence of the plateau in the current $I_2$ eliminates this transition point and therefore reduces the chance of flickering.

Figure 3A:
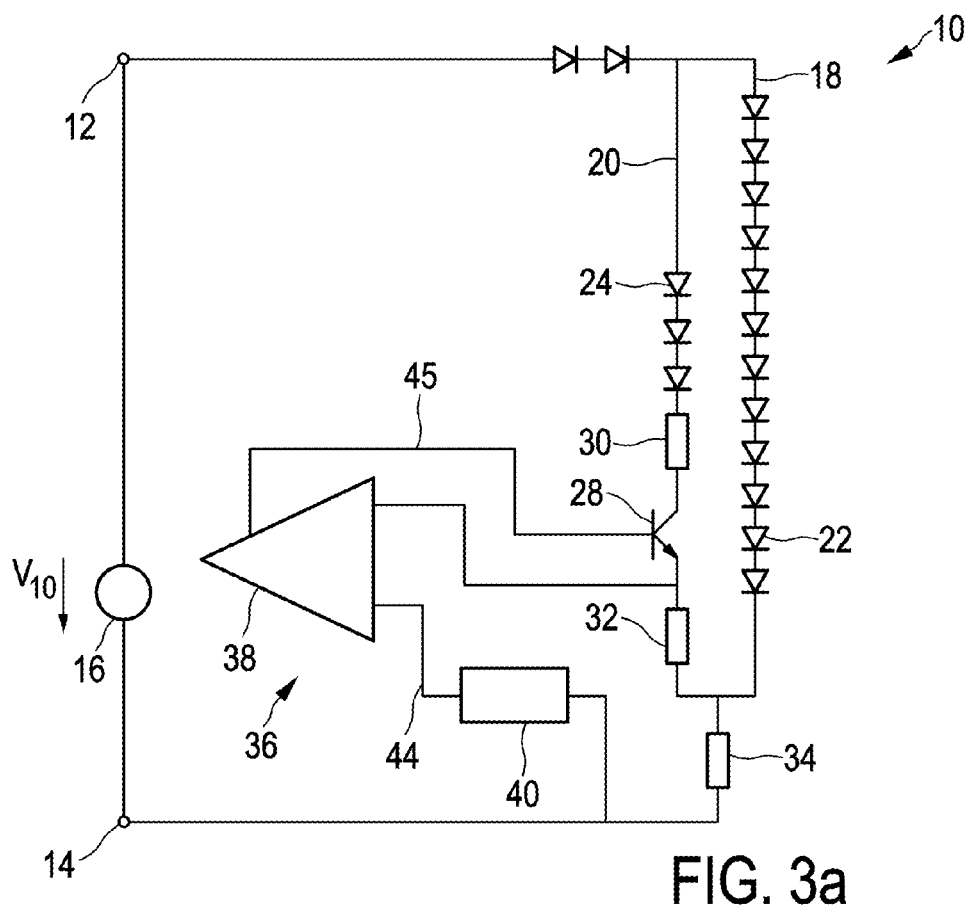
FIG. 3a shows a schematic block diagram of an embodiment of the light unit shown in FIG. 1 and FIG. 3b a corresponding current diagram.
Figure 3B:
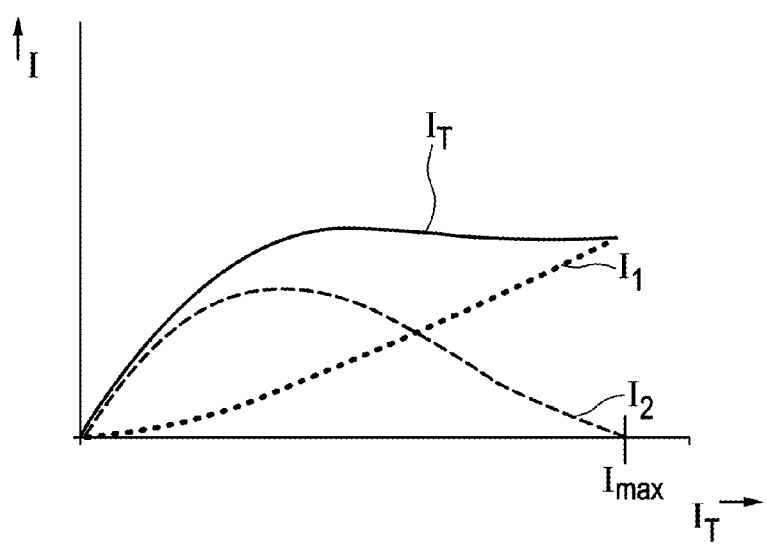

In FIG. 3a a further embodiment of the light unit 10 is schematically shown, wherein a corresponding current diagram is shown in FIG. 3b. Identical elements are denoted by identical reference numerals, wherein here merely the differences are explained in detail.

The first current path 18 comprises a string of twelve white diodes 22 and the second current path 20 comprises three amber diodes 24. When dimming the light unit 10 of FIG. 3a from the maximum current $I_{max}$, the current in the second current path 120 needs to be increased faster than the current in the first current path 18 decreases. Hence, the total current $I_T$ increases slightly with dimming so that no current split in the two current paths is possible as shown in FIG. 3b.

To overcome this problem, the first current path 18 is split in two parallel paths 58, 60 each having six white LEDs 22. Due to the fact that the total current $I_T$ is split in the two paths 58, 60 and the second path 20, the total current follows a straight line as shown in FIG. 4b. Further, the white LEDs 26 shown in FIG. 1a are replaced by two parallel LEDs 62, 64 and the LEDs 24 of the second current path 20 are replaced by LEDs emitting a warm white corresponding to a color temperature of 2200 K.

Figure 4A:
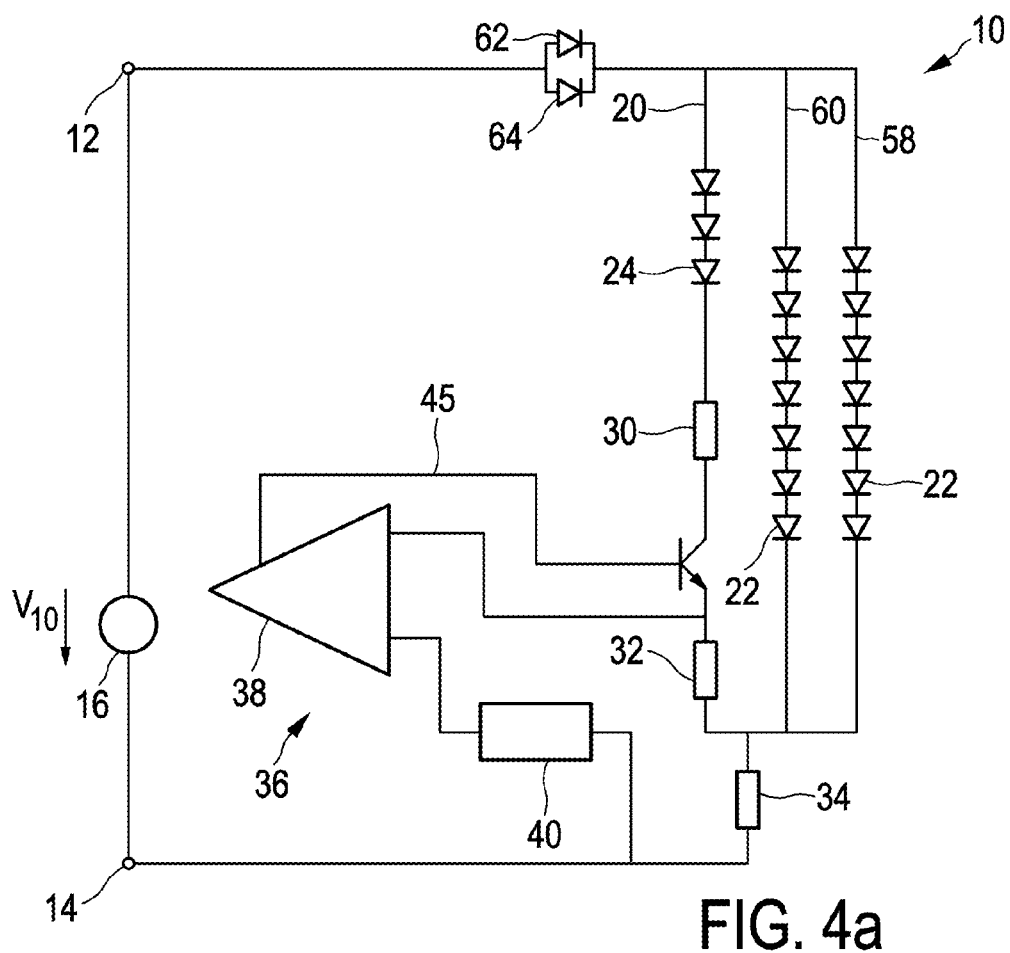
FIG. 4a shows an embodiment of the light unit shown in FIG. 1a and FIG. 4b a corresponding current diagram.
Figure 4B:
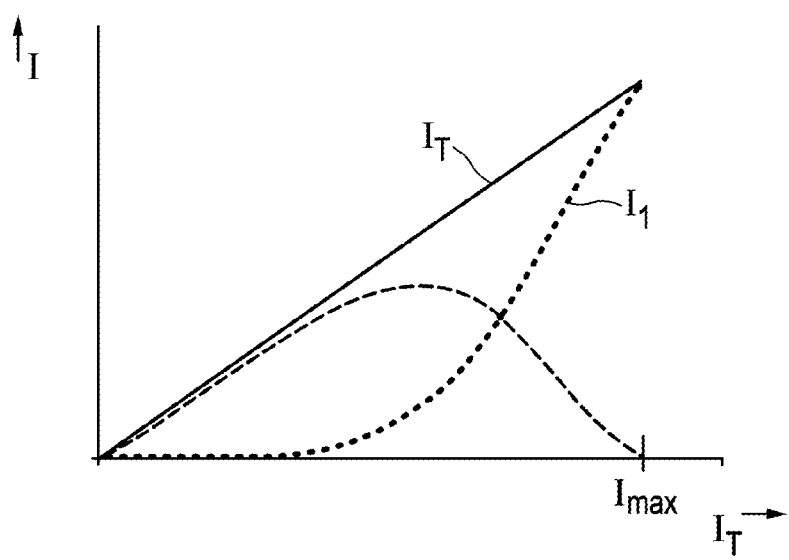

By means of the embodiment shown in FIG. 4a, the straight and linear behavior of the total current can be achieved as shown in FIG. 4b.

Figure 5:
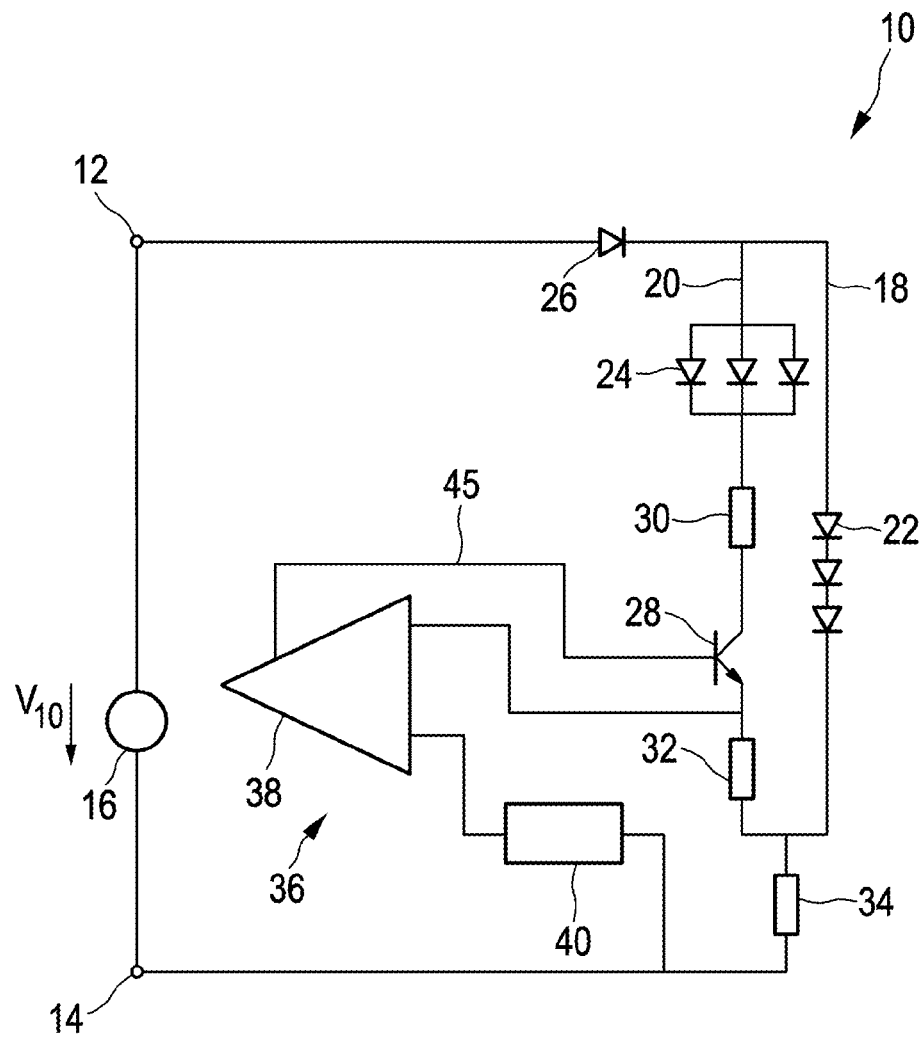

FIG. 5 shows a further embodiment of the light unit 10. Identical elements are denoted by identical reference numerals, wherein here merely the differences are explained in detail.

The LEDs 24 of the second current path are connected in parallel to each other, wherein the white LEDs 22 are high lumen or high power LEDs and the amber LEDs 24 are low lumen or mid power LEDs. Hence, the total costs of the light unit 10 can be reduced, however, the amber or warm white LEDs 24 have to be connected in parallel to each other to balance the current through the LEDs and/or the voltage of the white LEDs 22 and the amber LEDs 24.

Figure 6:
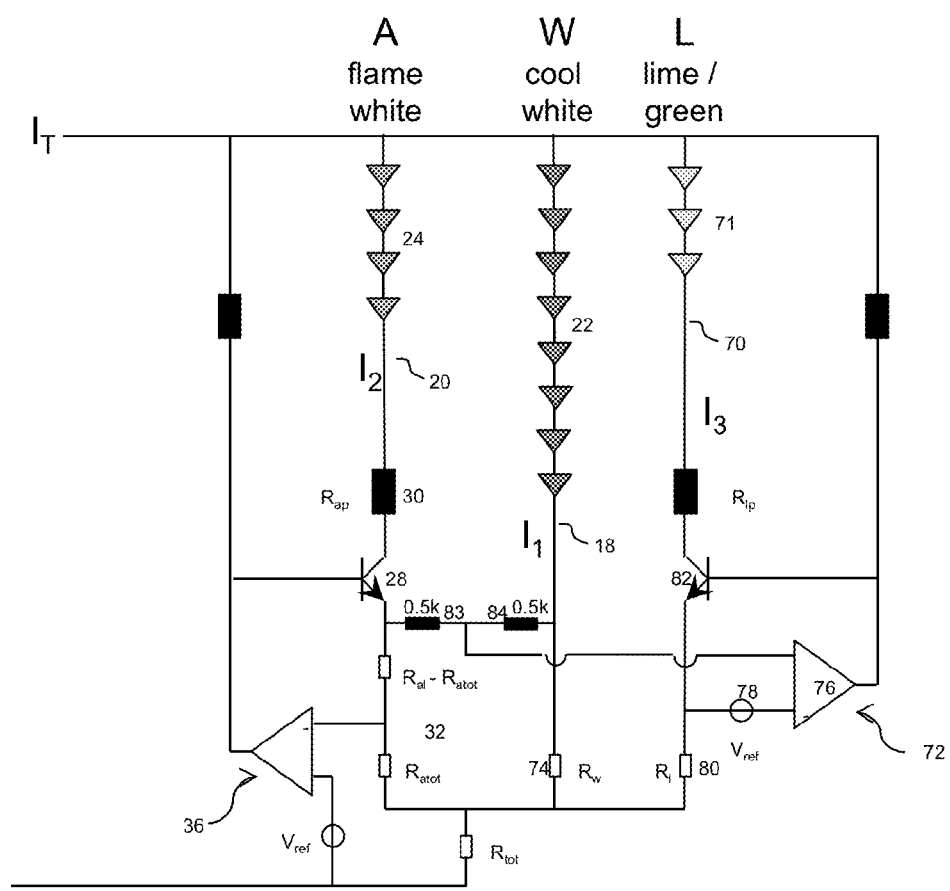
FIG. 6 shows the schematic circuit further embodiment according the invention.

The LEDs 24 may be replaced by 2200K warm white LEDs. LEDs 22 are the cool white LEDs FIG. 6 shows a further embodiment of the invention that has an extra third current path, whose current is further controlled according to a weighted sum of the current in the first current path and the current in the second current path. The components and circuit arrangement that are similar with those in FIG. 1a are noted with the same reference signs. They operate in the similar manner as described above, and in turn the description will not give repeated discussion.

The new components are:

a third current path 70 comprising at least one lighting device 71, wherein the third current path 70 is connected in parallel to the first current path 18 and the second current path 20, and comprises a third current regulator 82 for controlling a third electrical current (13) in the third current path 70; and a third control unit 72 adapted to control the third current regulator 82 based on a weighted sum of the electrical current $I_2$ in the second current path 20 and the electrical current $I_1$ in the first current path 18.

More specifically, a second weight on the current $I_2$ in the second current path is higher than a first weight on the current $I_1$ in the first current path.

Under the above weighted relationship, given the current $I_1$ and $I_2$ provided in FIG. 1b, the current $I_3$ in the third current path would increase during the region $I_{T1}$ from to $I_{T2}$, due to the increase in $I_1$ and the plateau in $I_2$; and then decrease during the region $I_{T2}$ from to $I_{max}$, due to more weighting on the decreasing $I_2$ despite of the less weighting on the increasing $I_1$. This causes a pyramid shape on the current $I_3$ in the third current path. In a preferred embodiment, the lighting device 71 in the third current path 70 is green color or lime color or mint color or yellowish color, and this pyramid shaped green/lime/mint color or yellowish color along the dimming scope further matches the black body line.

More specifically, the third control unit 72 is adapted to control the current $I_3$ to increase gradually from zero when the total current $I_T$ is above the first threshold current $I_{T1}$. Moreover, said third control unit 72 is adapted to control the current $I_3$ in the third current path decrease to zero gradually when the total current $I_T$ is above the above mentioned second threshold current $I_{T2}$.

Figure 7:
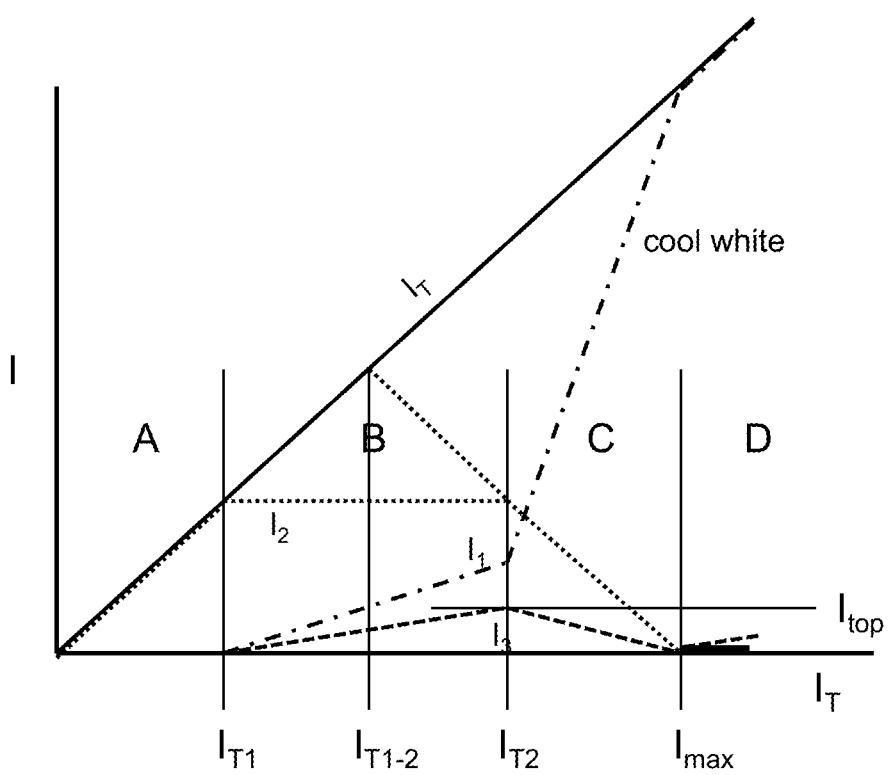
FIG. 7 shows the schematic current curves in the circuit as shown in FIG. 6.

FIG. 7 shows the currents in the different first, second and third current paths, as the total current $I_T$ changes from zero to the upper limit $I_{max}$. The solid line is the total current $I_T$, the dotted line is the current $I_2$ in the second current path, the dash-dot line is the current $I_1$ in the first current path, and the dash line is the current $I_3$ in the third current path.

The specific shape can be provided by tuning the resistors in the circuit. The mathmatic calculation will be given as below, together with the example parameter for the LEDs and etc.

As shown in the FIG. 6, the white resistors are low sense resistors. The black resistors are high value resistors, either to achieve a plateau flame white or lime current or to achieve a voltage to sense that is a weighted average of the flame white sense current and the cool white sense current. The two bipolar transistors create such a resistance ≥0Ω that the sensed voltage obeys a certain relation. This relation is dictated by the reference voltage and the sense voltages.

Now take the resistors 83 and 84 ΔkΩ, Δ=0.5. When the flame white current control via the opamp 36 and the bipolar transistor 28 is active then the following relation holds:

$$I_2 R_{atot} + I_T R_{tot} = V_{ref} \quad (1)$$

This occurs in region C. The active control of the lime current occurs in region B & C (where no lime plateau current) and the current relation is as follows:

$$I_3 R_l + V_{ref} = \Delta I_2 R_{al} + (1-\Delta) I_1 R_w = \frac{I_2 R_{al} + I_1 R_w}{2} \quad (2)$$

The sense and plateau resistor values can be estimated uniquely from the desired current curves. First the $I_{max}$ yields the sense resistor value $R_{tot}$:

$$R_{tot} = \frac{V_{ref}}{I_{max}}$$

The flame white plateau current is determined by the $R_{ap}$ and the voltage difference between the cool white LED string and the flame white LED string. Assuming that the LED forward voltage ≈3V for each LED, then one finds:

$$R_{ap} \approx 3(\#_{cool} - \#_{flame})/I_{T1}$$

Where $I_{T1}$ the desired plateau current for the warm/flame white LED and # denoting the number of LEDs. So in the plateau there is a voltage equilibrium between the flame and the cool string. It can also be created by using another opamp-transistor-Rsense control loop on the flame white string. The bipolar transistor voltage in the plateau region is (theoretically) 0Ω. The last unknown is the $R_{atot}$ that is determined by the $I_{T1-2}$:

$$R_{atot} = \frac{V_{ref}}{I_{T1-2}} - R_{tot}$$

Note that $I_1$, $I_2$ and $I_4$ uniquely determine the $I_3$:

$$\frac{I_{max} - I_{T1-2}}{I_{T1-2}} = \frac{I_{T2} - I_{T1-2}}{I_{T1-2} - I_{T1}}$$

The new step compared to the embodiment in FIG. 1a is the addition of a third current path with lime/green LEDs. This is needed if one wants to make white dimmable light with cool white as the white at 100% and flame white at low fluxes (~10%); i.e. with warm glow effect and make the colour points of the lamp follow the curved BBL line.

The sense resistor values for the lime/green by-pass are estimated as follows. At $I_{max}$ the lime current should be zero, therefore from (2) it follows that:

$$R_w = \frac{V_{ref}}{(1-\Delta)I_{max}} = \frac{2V_{ref}}{I_{max}}$$

At $I_{T1}$ the lime current should also be zero, again from (2) it follows that:

$$R_{al} = \frac{V_{ref}}{\Delta I_{T1}} = \frac{2V_{ref}}{I_{T1}}$$

The $R_l$ sense resistor value determines the height of the lime curve. Using equation (2) it can be derived that:

$$R_l = \frac{(I_{T2} - I_{T1} - I_{top})(1-\Delta)R_w}{I_{top}} = \frac{(I_{T2} - I_{T1} - I_{top})R_w}{2I_{top}}$$

Alternative to the pyramid shape for the lime current in the third current path, similar as the flame white is given a plateau current via the $R_{ap}$, the top in the lime current curve can also be chopped off by adding a large resistance $R_{lp}$ in the lime string, resulting in a region with voltage equilibrium.

Now consider a more specific embodiment: a pcb with eight 5700 K 3020 LEDs, four 2200 K 2016 LEDs and three lime 2016 LEDs in a set up as depicted in FIG. 6. (The 2016 lime LEDs currently do not exist, but could exist as lime 3020 does exist. The performance is extracted from the 4000 K 3020 LED, the lime 3020 LED and the 4000 2016 LED behaviour.) Consider the pcb (and LED) temperature to be 25° C.

Figure 8A:
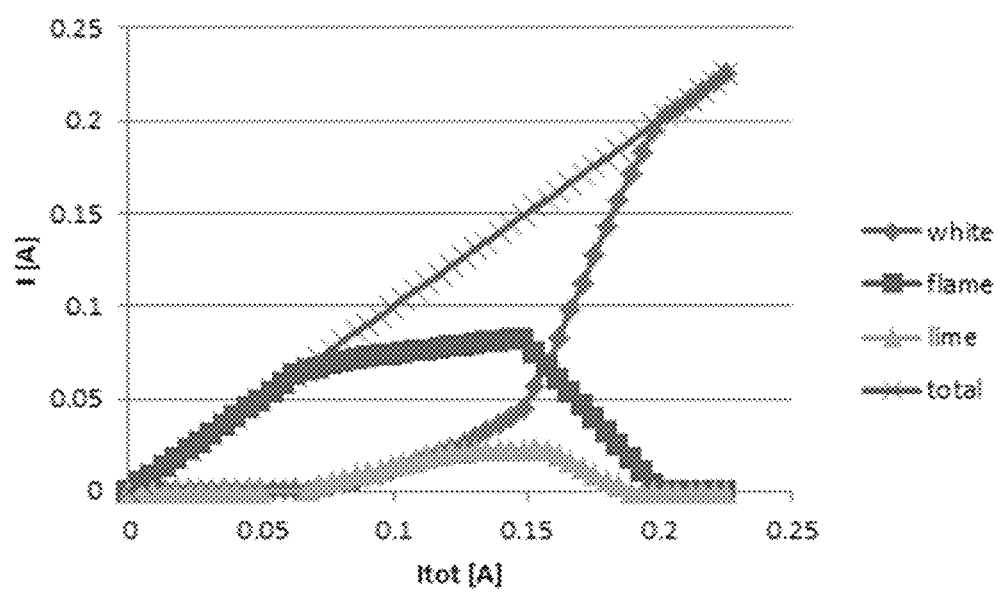
FIG. 8a shows the simulated current curves in the circuit as shown in FIG. 6.
Figure 8B:
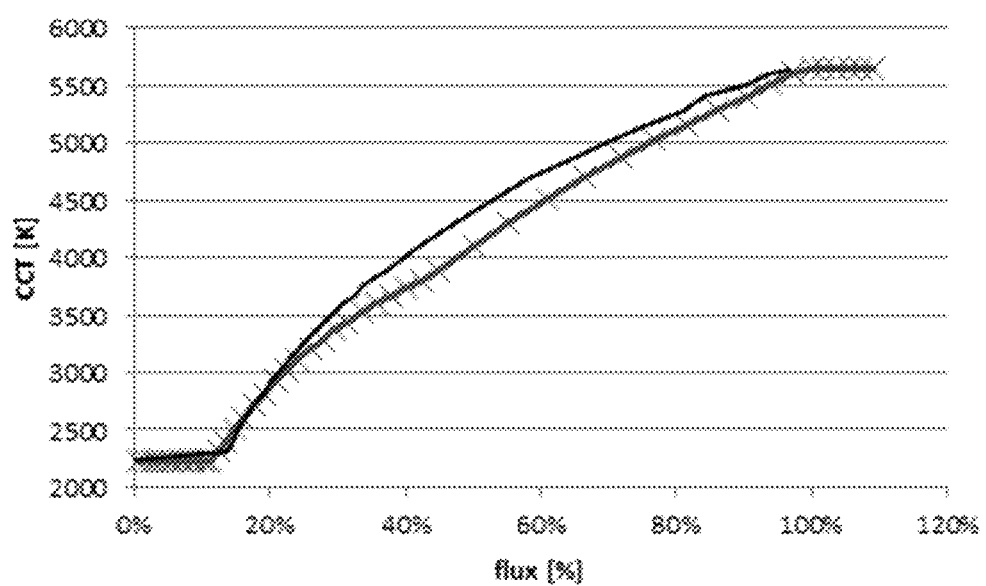
FIG. 8b shows the comparison in CCT of the further embodiment of the invention and incandescent lamp.
Figure 8C:
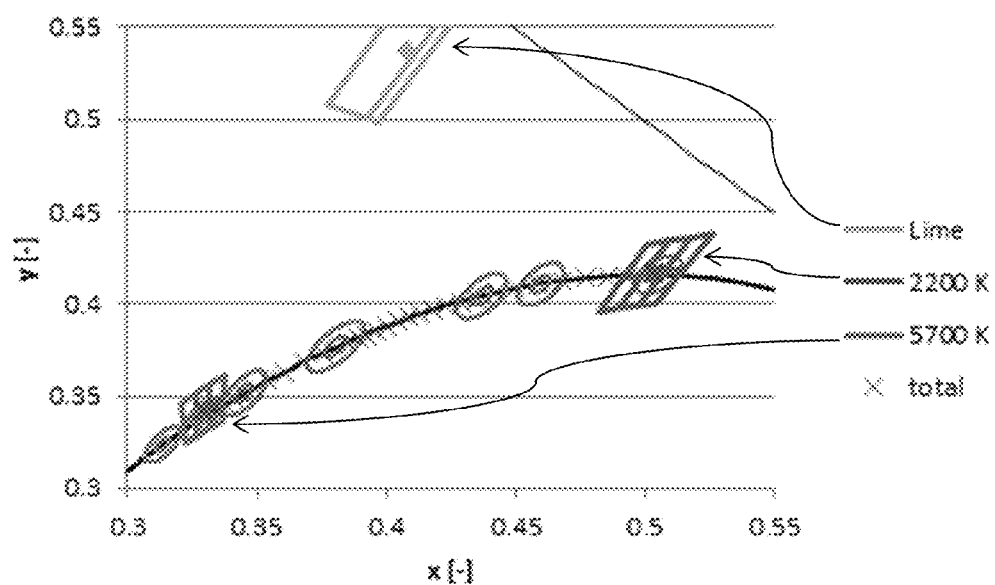
FIG. 8c shows the colour point behaviour of the further embodiment of the invention.

The three FIGS. 8a to 8c show the electrical, flux (wherein the dash connected line is the flux of the embodiment and the solid curve is the flux of the incandescent lamp) and colour point behaviour of the system, obtained by optimizing the resistor values for minimum colour deviation from the BBL and a scaled flux vs CCT curve. The values of the resistors are shown in the table 1, and the unit is Ω and V.

TABLE 1

| | | | Rw sense |
| | | | 0.589 |
| | | Ratot sense | Ral sense |
| | | 0.222 | 2.195 |
| Rap | Rlp | Rtot sense | Rl sense |
| 120.9 | 624.8 | 0.350 | 1.040 |
| | | Vref | Vref |
| | | 0.07 | 0.07 |

The proposed by-pass circuitry results in the desired colour and flux track when the total current is reduced; i.e. dimming. The 70 mV reference voltage assures that the Rsense in the cool white string remains low; 0.589Ω. This is to assure that the power loss in these resistors remains low and the efficiency of the lighting device high when it operates at ~100%. The lime current peak is slightly "chopped off" by the Rlp and results in a better fit of the BBL track and a low power loss in the transistor. The sense resistor in the flame white string have a relatively high value: 2.195Ω, but the power losses remain low, as the max current in this string is below 0.1 A. The bigger resistance in the sense resistor in the flame white string provides the larger weight for the current in the flame white string.

Figure 9:
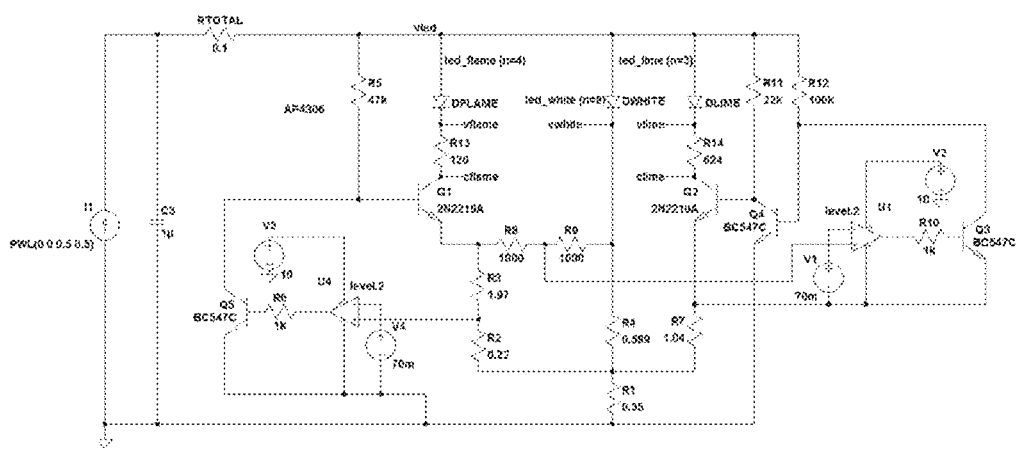
FIG. 9 shows the circuit diagram according to the further embodiment of the invention.

FIG. 9 shows a circuit diagram that implements the embodiment as shown in FIG. 6.

Figure 10A:
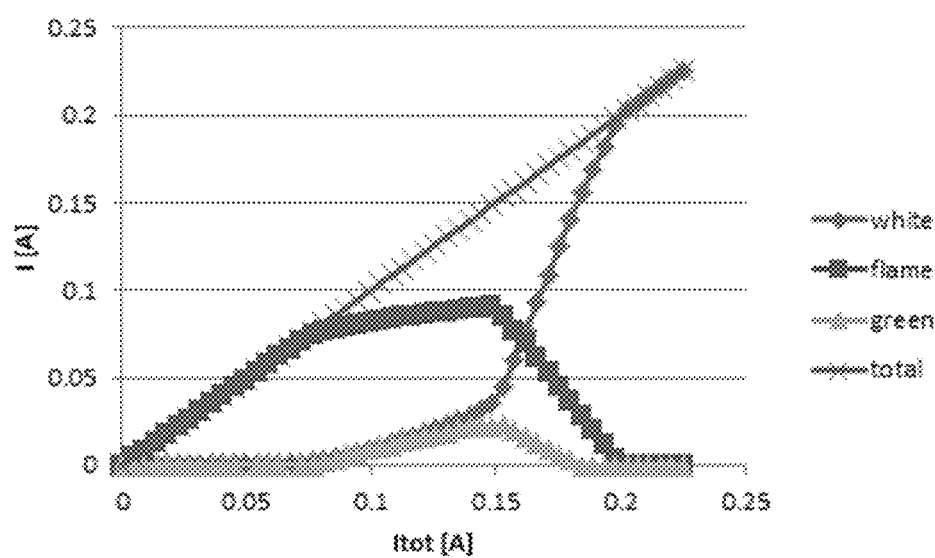
FIGS. 10a to 10c shows the current curves, CCT and colour point of the further embodiment under different component configuration.
Figure 10B:
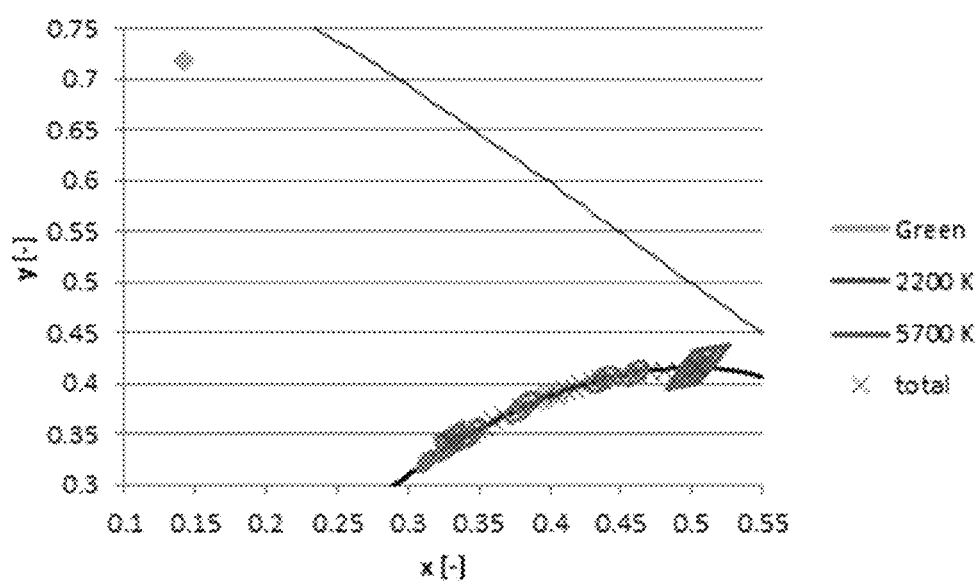
Figure 10C:
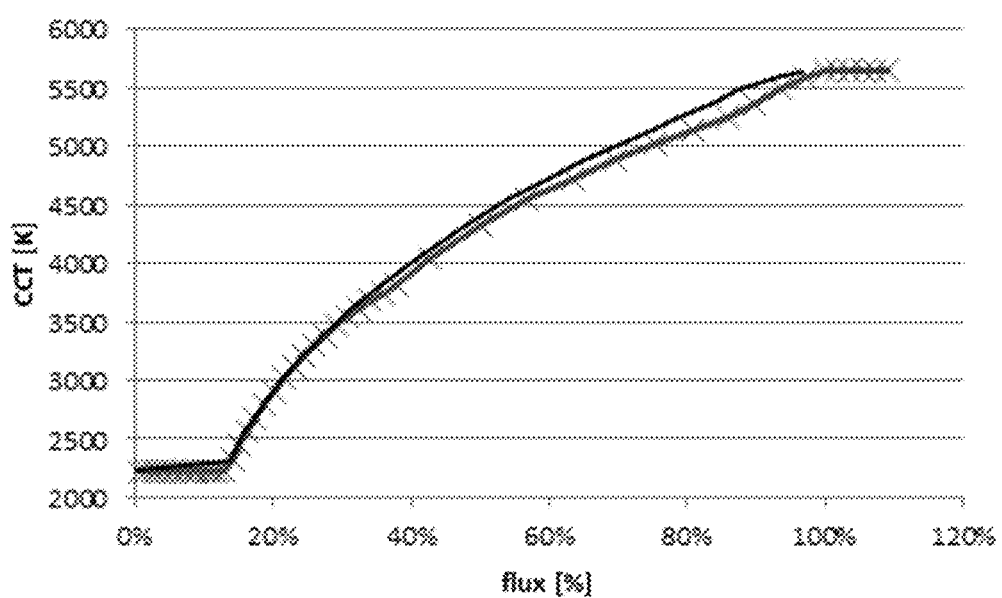

In case the 3 lime LEDs are replaced by 3 green LEDs (direct green 2835, colour point x=0.1416, y=0.7187), then the behaviour is very comparable. This is shown in the three FIGS. 10a-c. As the current spilt into 5700 K, 2200 K and green is very alike the case of lime, the resistor values are also comparable.

Figure 11A:
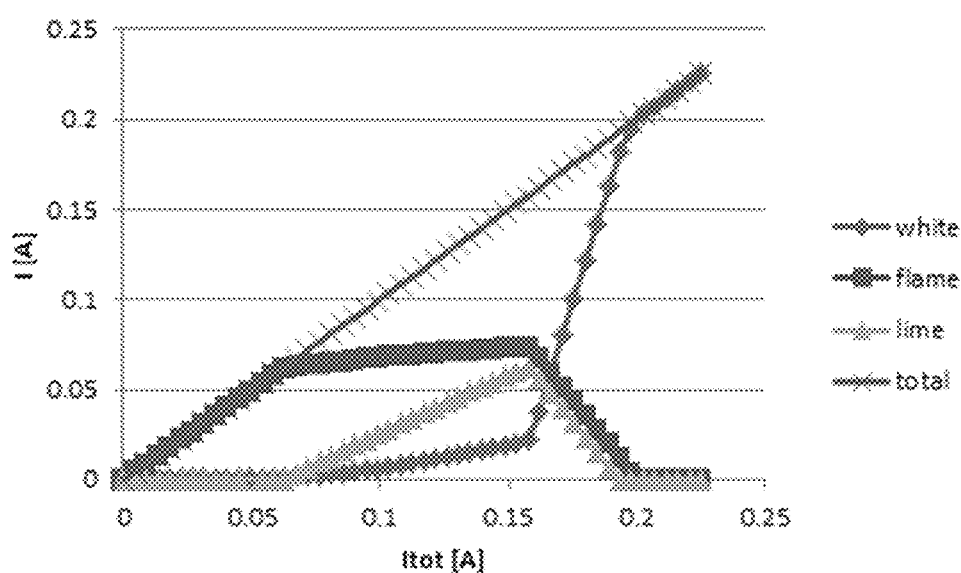
FIGS. 11a and 11b shows the current curves of the further embodiment under other different component configurations.
Figure 11B:
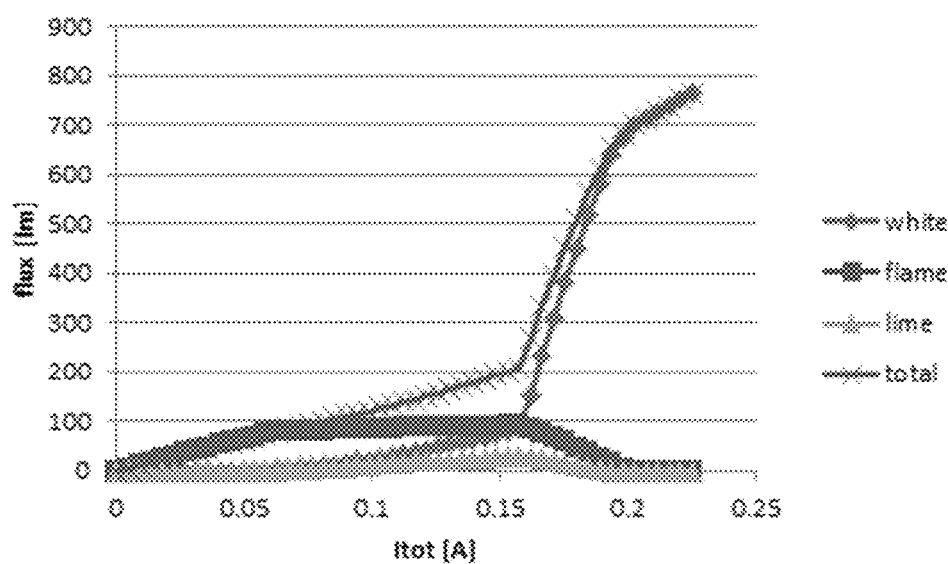

In case of lime 2016 LEDs, the max current is 100 mA, just as for the 2200 K 2016 LED. As can be observed in FIG. 8a, the lime current is far below its maximum. This means that the lime current can be increased and the lime LED count can be decreased. However if 1 lime 2016 LED is taken, then the current spilt gives very steep lines in the region 150 mA-200 mA, as shown in the FIG. 11. This not only makes the system very sensitive to changes in this region, but also the flux increase with total current becomes very ungradual; as shown in FIG. 11b.

Figure 12A:
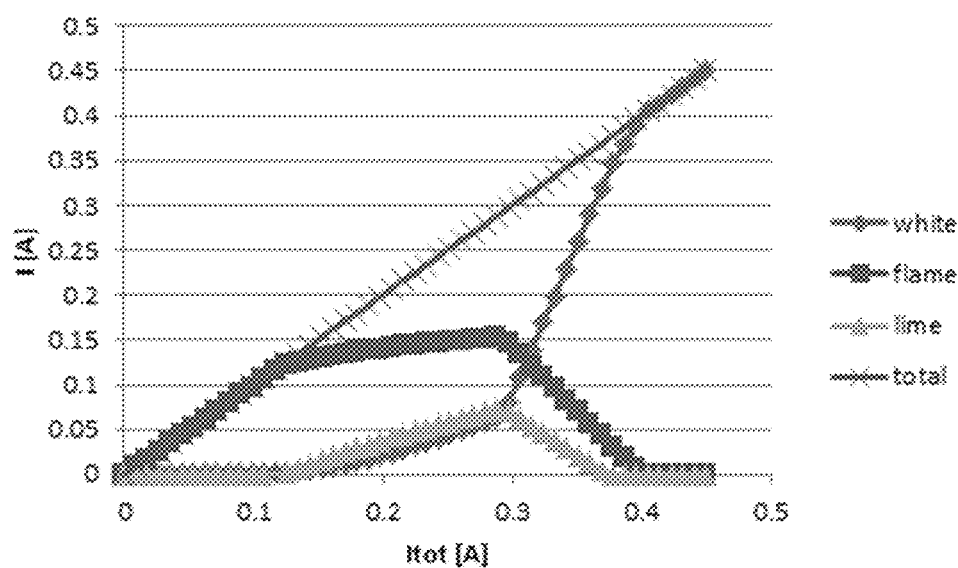
FIGS. 12a and 12b shows the current curves of the further embodiment under still other different component configurations.
Figure 12B:
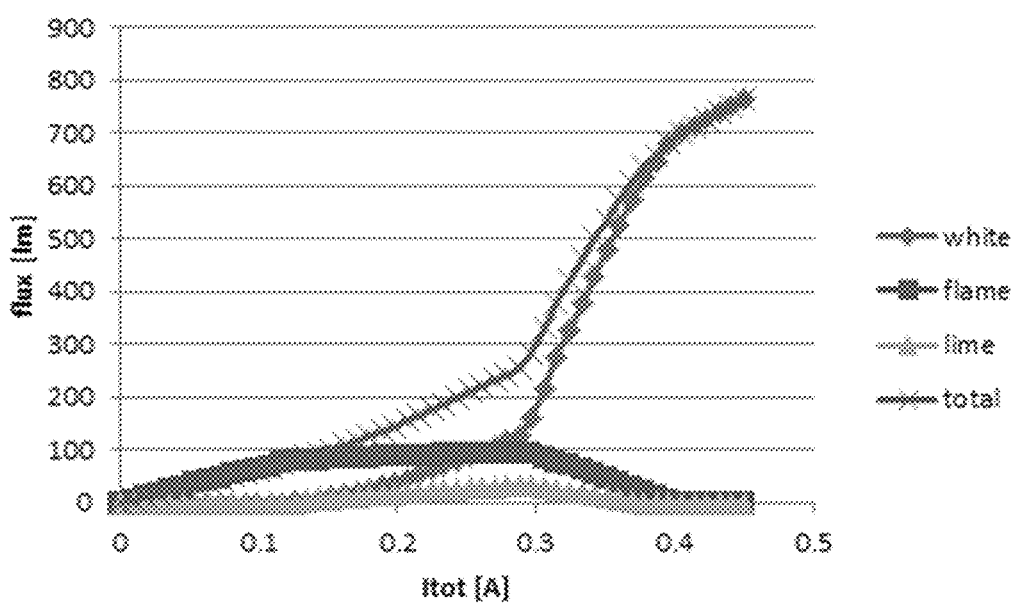

This can be overcome by placing white LEDs in parallel and with that increase the total current of the cool white string with a factor 2 (while the lime string remains at the same current). The effect of placing white LEDs in parallel (4s2p for 5600 K and 2s2p for 2200 K) is clearly visible when comparing FIGS. 12 and 11 in the decreased variation in slope for the total flux as function of total current.

Figure 13:
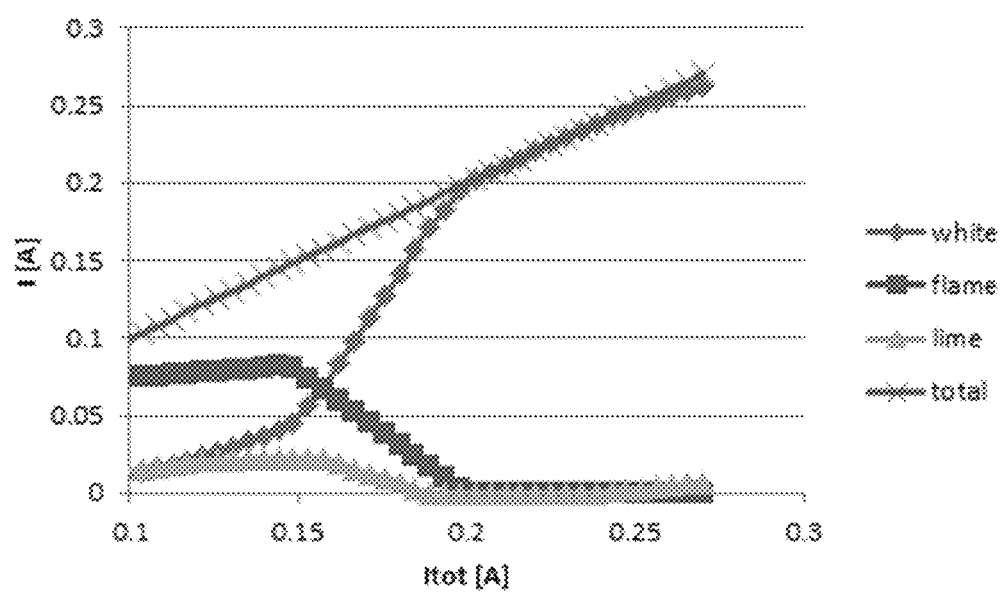
FIG. 13 shows an enlarged current curves wherein the current in the third current path reaches zero before the current in the second current path.

A last point of interest is the lime current after the flame white current has become 0 A ($I_{max}$). In theory the lime current should again increase after this point. In case both the lime and flame white control is such that the controlled current on the right side of the plateau current intersect the x-axis at the same position, then the lime current will go up again after this point (hence the dashed line in FIG. 7). This is unwanted as most designs are with a dead stroke at the high current side to assure that when a dimmer slightly decreases the total current of the LED device (even at 100%) the CCT still has its maximum value. To get such a flat region ($I_{lime}=I_{flame}=0$) the lime current can be made to intersect the x-axis just before the flame white does intersect. The FIG. 13 shows the effect of this deliberate difference in x-axis intersection. Indeed a flat region is achieved; but after further current increase the lime current does go up. More specifically, the early zero-reaching can be done by adjustment of the sense resistors. One can set the slopes of the "pyramid" independently via tuning Rw and Rl, as explained in the above formula.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A lighting unit including a plurality of lighting devices for emitting light, comprising: a connection terminal for receiving a total current from an external power supply;
   a first current path, an end of which is electrically coupled to the connection terminal, the first current path comprising at least a first light device; and
   a second current path, an end of which is electrically coupled to the connection terminal, the second current path comprising at least a second lighting device, wherein the first current path and the second current path are connected in parallel to each other and the second current path is electrically conductive while the first current path is electrically nonconductive when the total current is less than a first threshold current,
   wherein the second current path has a current regulator adapted to control an electrical current of the second current path, a control unit adapted to control the current regulator based on the electrical current of the second current path and based on the total current, and a current limiter adapted to limit the electrical current in the second current path so as to shape a plateau in the electrical current of the second current path when the total current is greater than the first threshold current;
   wherein the lighting unit further comprises:
   a third current path, an end of which is electrically coupled to the connection terminal, the third current path comprising at least a third lighting device, wherein the third current path is connected in parallel to the first and second current paths, and comprises a third current regulator adapted to control a third electrical current of the third current path; and
   a third control unit adapted to control the third current regulator based on a weighted sum of the electrical current of the second current path and the electrical current of the first current path.

2. The lighting unit as claimed in claim 1, wherein a second weight on the electrical current of the second current path is greater than a first weight on the current in the first current path.

3. The lighting unit as claimed in claim 2, wherein the third control unit is adapted to control the third electrical current of the third current path to increase gradually from zero when the total current is greater than the first threshold current.

4. The lighting unit as claimed in claim 3, wherein the control unit is adapted to control the electrical current in the second current path to gradually decrease to zero when the total current is greater than a second threshold current; and
   said third control unit is adapted to control the third electrical current of the third current path to gradually decrease to zero when the total current is greater than the second threshold current.

5. The lighting unit as claim in claim 4, wherein said third control unit is adapted to control the third electrical current of the third current path to reach zero before the electrical current of the second current path reaches zero.

6. The lighting unit as claimed in claim 2, wherein the second current path comprises a second sense resistor, the first current path comprises a first sense resistor, and the third control unit comprises a second operational amplifier electrically connected to an interconnection of the first sense resistor and the second sense resistor, wherein a resistance value of the second sense resistor is greater than that of the first sense resistor such that said second weight is greater than the first weight.

7. The lighting unit as claimed in claim 6, further comprising high value resistors electrically coupled between the interconnection and the first sense resistor and between the interconnection and the second sense resistor.

8. The lighting unit as claimed in claim 6, wherein the third control unit comprises a third internal voltage supply for providing a third reference voltage with respect to the first threshold current and the total current when the third electrical current reaches zero, and said third internal voltage supply is electrically connected in series with a third sense resistor in the third current path.

9. The lighting unit as claimed in claim 8, wherein the third control unit comprises a third current regulator electrically connected in series with the third lighting device and a comparator, the series connection of the internal voltage supply and the third sense resistor is connected to a negative feed in terminal of the comparator, and the interconnection is connected to a positive feed in terminal of the comparator, and an output of the comparator is connected to the third current regulator.

10. The lighting unit as claimed in claim 6, wherein the third current path further comprises a third current limiter for limiting the third electrical current in the third current path so as to have a plateau shape.

11. The lighting unit as claimed in claim 9, wherein the third current limiter comprises an electrical resistor having a resistance so that a current value of the plateau shape is set corresponding to a voltage drop from the first lighting device to the third lighting device.

12. The lighting unit as claimed in claim 10, wherein a resistance value of the electrical resistor equals a quotient resulted from the voltage drop divided by the current value of the plateau shape.

13. The lighting unit as claim in claim 1, wherein the first lighting device, the second lighting device and the third lighting device emit light of different color or color temperature.

14. The lighting unit as claim in claim 13, wherein the first lighting device emits cool white light, the second lighting device emits warm white light, and the third lighting device emits one of:
   greenish color light; and
   yellowish color light.

15. The lighting unit as claimed in claim 1, wherein the current limiter comprises an electrical resistor for limiting the electrical current of the second current path and a controllable resistor electrically coupled in series with the electrical resistor, a resistance value of the controllable resistor being set to zero when the total current is between the first threshold current and the second threshold current,
   wherein the controllable resistor comprises a transistor.

* * * * *